United States Patent [19]

Leterme et al.

[11] 4,399,529
[45] Aug. 16, 1983

[54] OPTICAL DEVICE FOR RECORDING AND READING ON A DATA CARRIER

[75] Inventors: Dominique Leterme; Jean P. Le Merer, both of Paris, France

[73] Assignee: Thomson-CSF, Paris, France

[21] Appl. No.: 268,078

[22] Filed: May 27, 1981

[30] Foreign Application Priority Data

May 28, 1980 [FR] France .................. 80 11801

[51] Int. Cl.$^3$ ............................................. G11B 7/00
[52] U.S. Cl. ................................. 369/110; 369/112; 369/122
[58] Field of Search ................ 369/110, 122, 46, 112; 250/225; 350/401, 402

[56] References Cited

U.S. PATENT DOCUMENTS

| | | | |
|---|---|---|---|
| 3,240,548 | 3/1966 | Biessels | 350/401 |
| 3,969,573 | 7/1976 | Bouwhuis | 369/110 |
| 4,023,033 | 5/1977 | Bricot | 250/201 |
| 4,027,330 | 5/1977 | Maslowski et al. | 358/128 |
| 4,079,248 | 3/1978 | Lehureau | 250/201 |
| 4,203,133 | 5/1980 | Bricot | 369/45 |
| 4,334,300 | 6/1982 | Arquie | 369/46 |

FOREIGN PATENT DOCUMENTS

| | | | |
|---|---|---|---|
| 23868 | 2/1981 | European Pat. Off. | 369/110 |
| 2634243 | of 0000 | Fed. Rep. of Germany . | |
| 2271590 | 12/1975 | France | 250/201 |
| 2325953 | 4/1977 | France | 250/201 |
| 2332577 | of 0000 | France . | |
| 2412133 | of 0000 | France . | |
| 2440055 | of 0000 | France . | |
| 2801062 | of 0000 | France . | |
| 54-56807 | 5/1979 | Japan | 369/110 |

OTHER PUBLICATIONS

"Disk Storage Technology" by White, pp. 138-148, Sci. Am. Aug. 1980.
"Integral Autofocusing System & Method of Manufacture" by Goston-pp. 1906-1908 IBM Technical Disclosure Bulletin; vol. 23, No. 5, Oct. 1980.
Patents Abstracts of Japan, vol. 3, No. 98, Apr. 18, 1979, p. 97E131.

*Primary Examiner*—Alan Faber
*Attorney, Agent, or Firm*—Oblon, Fisher, Spivak, McClelland & Maier

[57] ABSTRACT

An optical device for recording and reading on a data carrier is provided with first optical means forming a composite source of radiant energy comprising a first semiconductor-laser source for producing a polarized reading beam, a second semiconductor-laser source for producing a polarized recording beam, the two directions of polarization being at right angles to each other, and an optical element for combining the two beams followed by a polarizer. The device is also provided with second optical means comprising an optical separating element, a quarter-wave plate and an optical system for focusing the two reading and recording components after reflection from the tracks of the disk on two distinct zones of an optoelectronic detection device.

8 Claims, 8 Drawing Figures

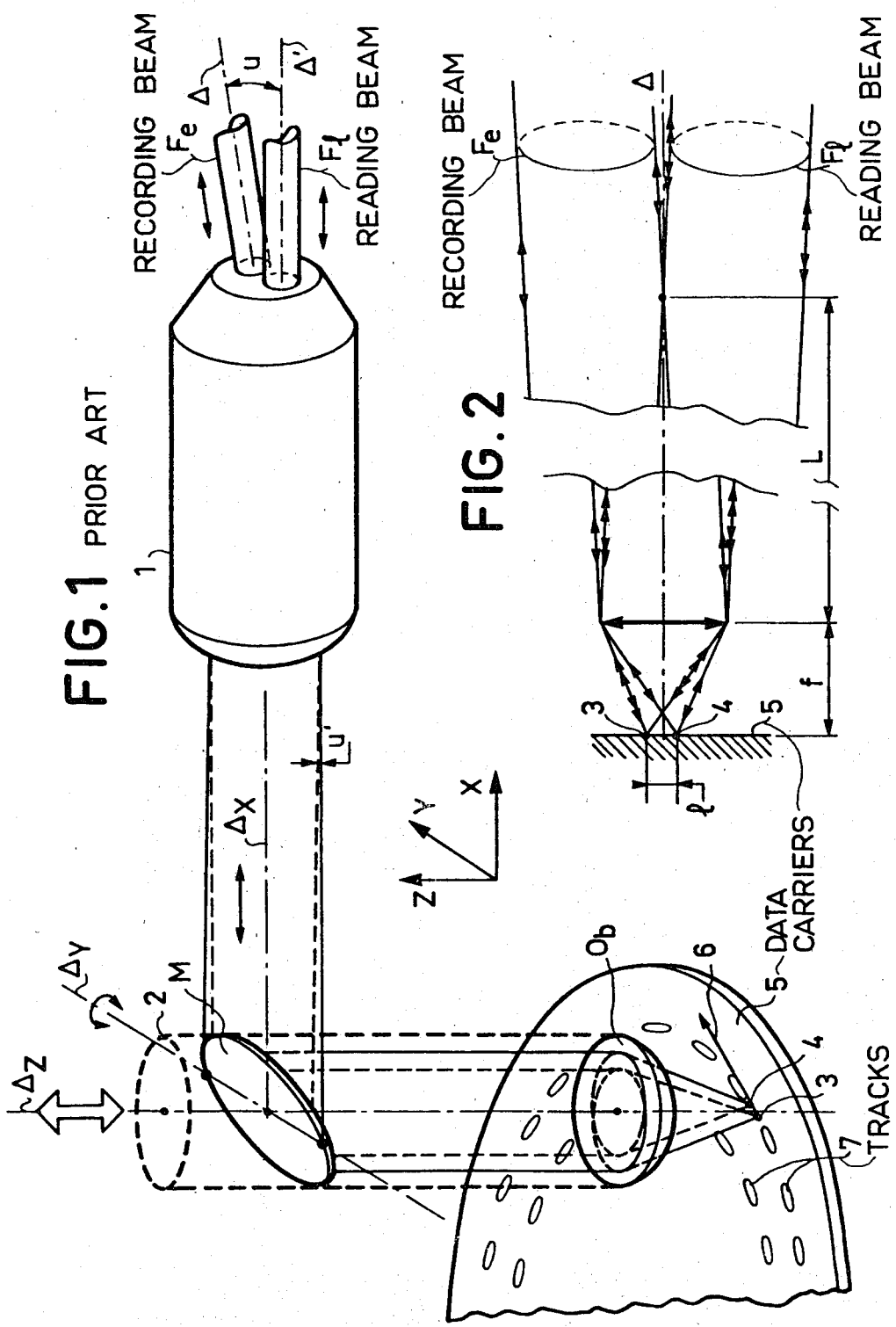

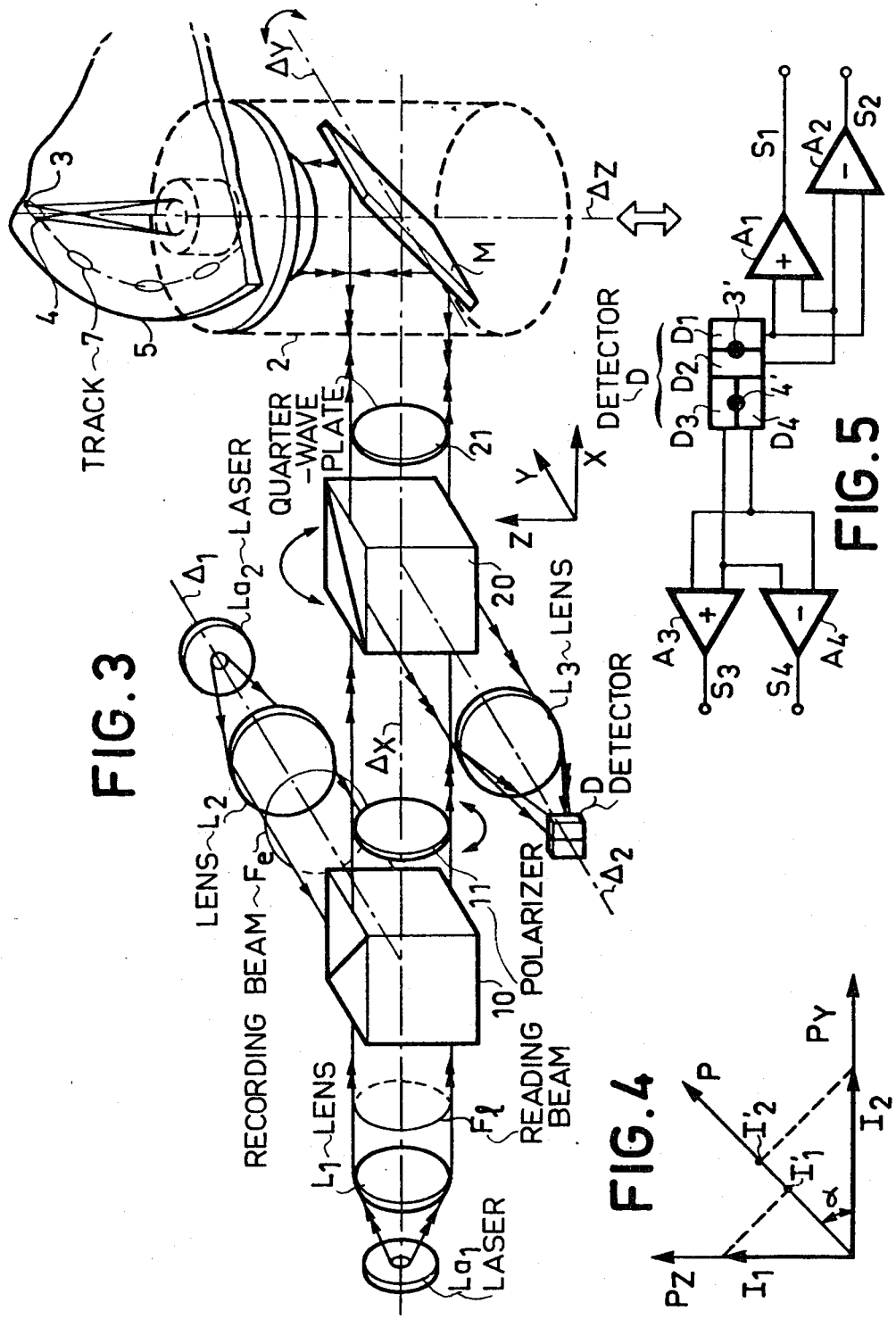

OPTICAL DEVICE FOR RECORDING AND READING ON A DATA CARRIER

BACKGROUND OF THE INVENTION

1. Field of the Invention

This invention relates to an optical device for recording and reading a data carrier.

2. Description of the Prior Art

The invention is more particularly concerned with recording and reading systems in which the data carrier is a disk. It is possible at the present time to record approximately $10^{10}$ binary data elements on a disk of about thirty centimeters in diameter. These systems can be employed as mass memories for digital data-processing assemblies. Systems of this type must permit random access to any predetermined portion of the recorded data such as, for example, a block of binary words of either fixed or variable length. Furthermore, the computation rate of the data-processing units calls for a large number of transfers between peripheral memories and the computation units. In consequence, access to any predetermined track of a movable data carrier must necessarily take place within the shortest possible time, both in order to read prerecorded data and in order to record said data irrespective of the position of said track on the disk. Typically, the mean access time must be less than 100 milliseconds.

Single-track access devices of currently available types are essentially intended for disks on which the recorded information contains a video signal in digital form. In these systems, the data access time is of the order of a few seconds, which is sufficient for this application.

In data access devices of the prior art, correct radial positioning of a optical recording and/or reading head is carried out by mechanical means either for producing displacements of the head or for producing displacements of the disk (as is more frequently the case). When the reading head and the disk are correctly positioned with respect to each other, radial following of the circular or helical track on which the information has been (or is intended to be) recorded is carried out by means of a galvanometer mirror which is capable of moving about an axis parallel to the plane of the disk and reflects a beam produced by at least one source of radiant energy comprising a laser. The head is also provided with a device for controlling vertical displacements of the objective employed for recording and reading. In actual practice, provision is made in the majority of instances for two sources, namely one source for reading and one source for recording.

Irrespective of the arrangements adopted, the mass of the moving system is too heavy to be compatible with the mean access times which are desirable in the field of data-processing. By way of example, in the method which consists in displacing a disk coupled to a rotary drive mechanism comprising in particular the driving motor, the mass to be set in motion is of the order of 1 Kg. In order to reduce the access time, it is possible to make use of a device in which only the recording and reading head is capable of moving whilst the laser-type energy source remains stationary. By way of example, the device comprises optical means of the afocal type for providing an optical coupling between the light energy source and the recording and reading head.

In a device of this type, provision is made for a moving system comprising a galvanometer mirror and a focusing objective which is movable with respect to the data carrier, and two stationary radiant-energy sources each comprising a laser emitter. The optical magnification means of the afocal type are inserted between the moving system and the radiant energy sources. The magnification is sufficient to ensure that the beam emerging from the optical means covers the entire entrance pupil of the objective. By virtue of this arrangement, the beam which reaches the moving system remains a beam of parallel rays irrespective of the position of said moving system with respect to the radiant energy sources. Reading and control of recording are carried out by detecting the intensity of the beams reflected from the surface of the read or recorded zones.

The device which has just been described in wholly suited to the application of gas lasers. This does not hold true in the case of sources of the semiconductor laser type which have been introduced more recently. These lasers entail the need for a collimating optical system and are equivalent to a source having a large useful emission diameter. It is no longer possible to use an afocal lens. The two parallel beams for reading and recording respectively which are emitted by the two corresponding sources and combined to form a composite beam have to be inclined at only a very small angle with respect to each other. It therefore becomes very difficult to detect these two beams separately in devices of small overall size. Long distances are in fact necessary in order to obtain complete separation of the beams.

The invention proposes a recording and reading device which remains compact, which permits perfect separation of the reflected recording and reading beams, and still has satisfactory power efficiency.

SUMMARY OF THE INVENTION

The aim of the invention is therefore to provide an optical device for recording and reading a data carrier, of the type comprising two fixed radiant-energy sources of the semiconductor laser type having a predetermined wavelength. The first source emits a first beam for reading data recorded on the data carrier; the second source emits a second beam for recording data on the data carrier. Recording and reading are performed by means of a recording-reading head rigidly fixed to a moving system which is displaceable with respect to the data carrier and comprising an objective for focusing the reading and recording beams respectively on predetermined zones of the data carrier, the beams being also reflected from said predetermined zones.

The optical device further includes a first optical device constituting a composite radiant energy source comprising the first and second fixed semi-conductor-laser sources which are each provided with stigmatic means for making said beams parallel. These sources are linearly polarized in first and second orthogonal directions and emit beam components in the first and second emission directions which are parallel respectively to first and second axes, said beam components being passed through an optical element of refractive material having a preferential optic axis parallel to one of the directions of polarization. The incident beam emitted by one of the sources having a direction of polarization parallel to the preferential optic axis is transmitted by the optical element in a direction parallel to said first axis without modification whilst the incident beam emitted by the other source aforesaid is totally reflected in the same direction by the optical element.

The optical device under consideration is provided in addition with a second optical device placed on the first axis and including a second optical element of refractive material which also has another preferential optic axis, with the second optical element being intended to transmit all or part of the composite beam in a direction parallel to the first axis, the direction of polarization of the emergent composite beam being parallel to the other optic axis aforesaid. Provision is also made for a quarter-wave plate having the function of converting the linear polarization to circular polarization, the polarized composite beam being transmitted to the recording-reading head, and for a convergent optical system placed on a third axis. After reflection from the data carrier, the composite beam is totally reflected in a direction parallel to the third axis by said second optical element and the convergent optical system has the function of focusing the two components of the beam to two separate and distinct points of impact on an optoelectronic detection device.

BRIEF DESCRIPTION OF THE DRAWINGS

These and other features of the invention will be more apparent to those skilled in the art upon consideration of the following description and accompanying drawings, wherein:

FIG. 1 is a recording-reading device in which radiant energy sources of the gas-laser type are employed;

FIG. 2 is an explanatory diagram of a particular feature of the invention;

FIG. 3 illustrates a first alternative form of construction of an optical recording-reading device according to the invention;

FIGS. 4 and 5 illustrate the operation of optical elements employed by the device according to the invention;

DETAILED DESCRIPTION OF THE PREFERRED EMBODIMENTS

Figure 6:
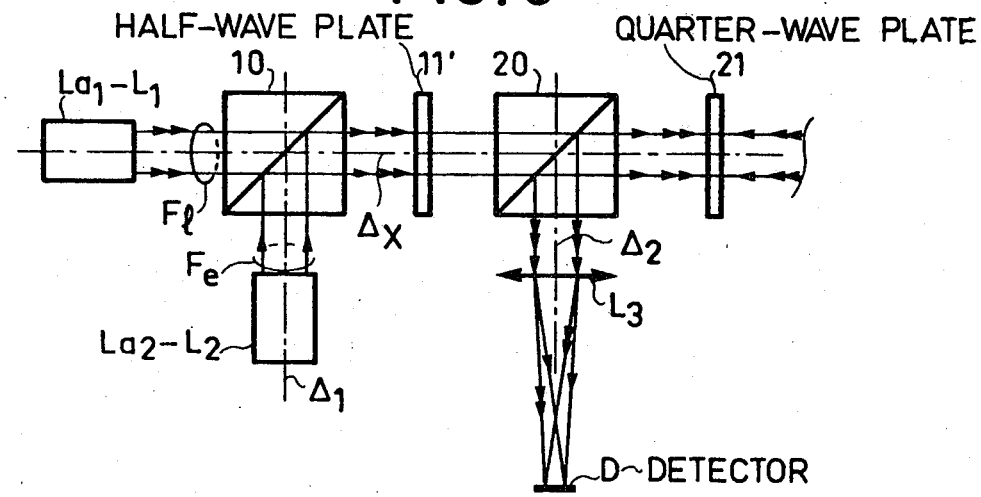
FIGS. 6 and 7 illustrate respectively a second and a third alternative form of construction of an optical recording-reading device according to the invention.

Since the invention relates to an optical device for recording and reading data carriers, especially in the form of disks, it will accordingly be useful to recall the constituent elements employed in conventional practice. Disks of this type can be employed either for recording data at a predetermined point of a previously-written smooth track or for reading data which have been recorded at any point of said track. As is already known, the disk is approximately 30 cm in diameter and driven in a movement of rotation by means of a drive motor rigidly fixed to the frame of the optical recording-reading device.

The invention is more particularly concerned with devices of the type comprising a stationary portion constituted by the light energy sources and a movable portion constituted by the recording-reading head. The head comprises an objective of the microscope type rigidly fixed to an electromagnetic coil which is capable of undergoing displacement within the magnetic field of a permanent magnet for ensuring vertical position-control and a galvanometer mirror for ensuring radial position-control.

FIG. 1 illustrates one example of construction of a recording-reading optical device of the type described in the foregoing in which gas-laser sources such as HeNe gas lasers, for example, are employed for producing the radiant energy. These lasers emit a parallel and polarized beam. In accordance with known practice, the cross-sectional area of said beam is very small and must consequently be enlarged. The device comprises two sources, namely a source which emits a reading beam $f_1$ and a source which emits a recording beam $f_e$. These sources are not shown in FIG. 1.

In order to carry out the reading operation, the parallel and polarized beam $f_1$ is enlarged by means of an afocal lens unit 1 having a magnification such that the emergent beam which is also parallel covers the entrance pupil of an objective $O_b$ of the microscope type. A galvanometer mirror M is inserted between the afocal lens unit 1 and the objective $O_b$ in order to deviate the rays which propagate in a direction parallel to the optic axis $\Delta_x$ along the axis $\Delta_z$. The axes $\Delta_x$ and $\Delta_z$ are respectively parallel to the axes X and Y of the reference trihedron XYZ. The objective $O_b$ focuses the reading beam at the point 3 on the data carrier disk 5. Said disk is driven in a movement of rotation which is indicated by the arrow 6. The objective $O_b$ and the mirror M are rigidly fixed to a moving system 2 which constitutes the recording-reading head. Forward displacement of said moving system can be obtained by any known means. By way of example but not in any limiting sense, such means can consist either of a belt driven by pulleys (as in the case of curve tracers) or of a screw and nut system for displacing balls (as in certain types of recording-reading devices and in the case of the so-called floppy-disk systems) or of a linear motor. The moving system is capable of displacement along the axis $\Delta_z$ and is driven by control means in such a manner as to ensure that the reading beam is accurately focused on the tracks 7 which carry the data to be read. Furthermore, the mirror M is capable of moving about the axis $\Delta_y$ in order to ensure radial position-control.

One well-known method for recording data consists in forming microcavities or, more generally, in forming microelevations at the surface of the disk 5 and of variable length in the direction of the tracks 7. Said tracks are provided in the form of a single spiral or of concentric circles. The variable length of the microcavities or microelevations is representative of a modulation of time-duration of the data to be recorded.

In accordance with the arrangements contemplated for the device shown in FIG. 1, reading takes place by reflection of the reading beam which is focused at 3 on a reflecting surface such as, for example, a metallic deposit on that face of the disk which carries the microelevations. The reading beam is spatially modulated by the microelevations and this modulation represents the data recorded on the read face of the disk. By virtue of a reciprocity effect, the reflected beam follows the same path as on the outward trip and is detected by the optoelectronic devices (not shown in FIG. 1). The signals thus detected are employed for a number of different purposes: apart from their use for reconstitution of the data read on the disk 5, said signals are also employed for carrying out the position-control operations mentioned earlier. Methods of this type have been described by way of non-limitative example in the two following patent Applications: French patent Application No. 75 29 705 filed on Sept. 29, 1975 and published under No. 2 325 953; and French patent Application No. 74 01 283 filed on Jan. 15, 1974 and published under No. 2 271 590.

The same afocal lens unit is employed for the recording beam which has previously been modulated in the conventional manner. In order to differentiate the reading and recording spots on the disk 5, the recording beam $f_e$ is inclined with respect to the reading beam $f_1$ at a small angle u' at the exit of the afocal lens unit 1. The transverse magnification is given by the relation $\gamma = h'/h$. This magnification is chosen so as to be much larger than 1, with the result that the ratio of the angles u'/u is lower than 1, where u is the angle between the axes $\Delta$ and $\Delta'$ of the reading beam $f_1$ and writing beam $f_e$ at the entrance of the afocal lens unit. The eccentric displacement of the recording spot on the entrance pupil of the objective is therefore very limited. This displacement may also be disregarded at the time of a radial displacement of the head. From this is accordingly follows that, irrespective of the position of the objective along the optic axis $\Delta_x$, the recording beam is concentrated at the focus of the objective while ensuring good discrimination of the recording beam $f_e$ and of the reading beam $f_1$ at the exit of the afocal lens unit since, conversely, the ratio u/u' is considerably higher than 1.

The structure adopted for the recording-reading device in which the radiant energy sources of the recording-reading head proper are dissociated permits a weight reduction of the moving system to approximately 200 grams. This figure includes 100 grams in the case of the device for position-control along the axis $\Delta_z$ and 30 grams in the case of the galvanometer mirror M and its drive unit; the objective itself is of negligible weight. This light weight reduces the inertia of the reading-recording device and permits a mean data-access time of sufficiently low value for data-processing applications.

The device described in the foregoing is wholly suited to the use of gas-laser sources. This is not the case with the semiconductor-laser sources which have been introduced more recently. These lasers are designed in the form of an emissive disk and are characterized by a highly divergent emission within a cone of approximately 30°. Lasers of this type call for the use of a collimating optical system. The entire unit is equivalent to an emission source having a large diameter which is typically of 7 mm.

There is therefore no longer any need to employ an afocal lens unit as described in the foregoing for increasing the cross-sectional area of the reading and recording beams in order to ensure that the entrance pupil of the recording-reading objective is entirely covered and thus to obtain a sufficient degree of efficiency.

However, since two different beams are employed, namely a first beam for recording and a second beam for reading and by reason of the fact that the energy of these beams after reflection from the disk must be detected either in order to produce signals for restituting the read information or in order to produce signals for control purposes, it is consequently necessary to discriminate the reflected beams.

In point of fact, the two beams, namely the recording beam $f_e$ and the reading beam $f_1$ respectively must be focused on the disk 5 at points which are very close to each other in order to ensure that the recording spot 4 and reading spot 3 practically coincide so as to remain within the field of the recording-reading objective $O_b$. The focal distance of said objective is usually very small. In consequence, the angle u' between the two incident reading and writing beams is very small.

As already recalled in the case of the device of FIG. 1, the use of an afocal lens unit 1 causes the reflected recording and reading beams to be inclined to each other at a large angle u; in addition, these beams have a small cross-sectional area and therefore readily permit spatial discrimination.

In the case of semiconductor-laser sources, the cross-sectional area of the emitted beams is sufficient to cover the entrance pupil of the projection objective without calling for any intermediate optical means such as the afocal lens unit 1. In consequence, and by reason of the short focal distance of the recording-reading objective $O_b$ as well as the small distance between the reading and recording spots 3 and 4 respectively, it is accordingly necessary to place the devices for detecting the energy of the reflected beams at a very considerable distance from the objective $O_b$, thus entailing the need for cumbersome devices.

This aspect is illustrated in FIG. 2. If the distance between the reading and recording spots 3 and 4 is 1, the focal distance of the objective $O_b$ is f, the angle u' between the recording and reading beams $f_e$ and $f_1$ is given by the relation:

$$u' = 1/f$$

In consequence, the distance L along the optic axis $\Delta$ of the objective $O_b$ which is necessary in order to obtain total spatial separation of the two recording and reading beams $f_e$ and $f_1$ respectively is very considerable, thus entailing the need for recording-reading devices of very large overall size as has just been recalled.

Recourse can be had to optical discrimination means which make is possible to reduce the overall size just mentioned. However, these optical means must not give rise to high energy losses as would be the case with semitransparent mirrors, for example.

The invention proposes to meet these requirements.

FIG. 3 illustrates a first alternative embodiment of an optical recording-reading device according to the invention.

This device comprises three sub-assemblies. A first sub-assembly constitutes a composite radiant energy source. This source is intended to produce a composite beam made up of two components each assuming the form of a parallel and polarized beam respectively for reading and recording. These two beams are slightly inclined with respect to each other as recalled earlier with reference to FIGS. 1 and 2. Said first sub-assembly comprises a first semiconductor laser $La_1$ associated with a collimating optical system represented schematically by the lens $L_1$ and a second semiconductor laser $La_2$ which is also associated with a collimating optical system $L_2$. Said lasers can be of the GaAs having an emission wavelength $\lambda = 830$ nm. These two lasers emit respectively the reading component $F_1$ and the recording component $F_e$. These two components are linearly polarized and their directions of polarization are at right angles to each other. The two laser sources thus constituted emit in directions which are substantially parallel to the axes $\Delta_x$ and $\Delta_1$, these axes being in turn parallel to the axes X and Y of a reference trihedron XYZ.

Figure 8:
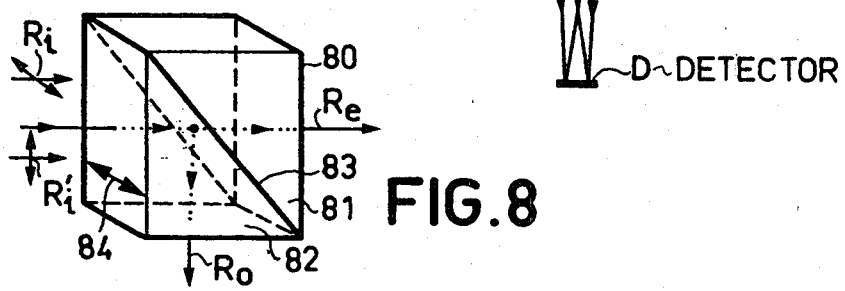
FIG. 8 is a detail view of another optical element employed in the device according to the invention.

These two components are then combined by the optical element 10. This element is illustrated in greater detail in FIG. 8 and can be a parallelepiped of refractive material. In a preferential alternative embodiment of the invention, the optical element consists of a cube 80 constituted by two cemented prisms 81 and 82. The interface 83 constituted by the hypotenuse of the two prisms is treated so as to produce a polarization-separating effect. This element has a preferential optic axis 84. The incident rays $R_1$ which have a direction of polarization parallel to said axis are totally transmitted without modification in the direction of emergence $R_e$ which is parallel to the direction of incidence; and the incident rays $R'_i$ which have a direction of polarization at right angles to the direction aforementioned are totally reflected in the direction of emergence $R_o$ at right angles to the direction of incidence. The faces of the cube have also been subjected to a surface treatment in order to prevent parasitic reflections. This treatment is known to anyone versed in the art.

Other optical elements may be employed within the scope of the invention, as is the case in particular with certain birefringent polarizers such as the Glan prism. However, preference should be given to the choice of a polarizer which transmits the incident rays of a first direction of polarization without any modification and totally reflects the rays having a direction of polarization at right angles to said first direction.

The effect which has just been described is employed to advantage by the device of FIG. 3. Since the optic axis 84 is parallel to the axis Z, the reading component $F_1$ is transmitted without modification by the cube 10 whereas the recording component $F_e$ is totally reflected by said cube. In consequence, the two components are combined by the cube 10 to form a composite beam. In FIG. 3, the emergent components coincide. In actual fact, these two components are inclined to each other at a small angle which is equivalent to the angle u' shown in FIG. 1.

The two components having directions of polarization at right angles then pass through an optical element 11 constituted by a polarizer in which the optic axis is inclined at a predetermined angle to the directions of polarization of the reading and recording components. The intended function of said polarizer element 11 will hereinafter be explained in greater detail with reference to the diagram of FIG. 4.

The two components emerge from the polarizer element 11 with a common direction of polarization which is parallel to that of the polarizer.

The resultant composite beam then passes through a second cube 20 which is identical with the cube 10 described earlier. If this cube is suitably oriented, the two components for reading and recording respectively which form the composite beam and have the same direction of polarization are wholly transmitted by the cube 20. In conjunction with detection devices comprising the convergent optical system represented schematically by the lens $L_3$ and optoelectronic detection means D as well as a quarter-wave plate 21 placed at the exit of the cube, said cube 20 constitutes the second sub-assembly of the optical recording-reading device in accordance with the invention.

The intended function of the quarter-wave plate 21 is to convert the linear polarizations of the two composite beam components to a circular polarization, for example in the anticlockwise direction. The optic axis of the plate must be inclined at an angle of $\pi/4$ with respect to the direction of polarization of the composite beam.

The composite beam which emerges from the quarter-wave plate 21 passes into the third sub-assembly of the recording-reading device in accordance with the invention and as constituted by a recording-reading head 2 which is identical in all respects to the head of FIG. 1. As in the case of the device described with reference to FIG. 1, only the recording-reading head is movable with respect to the data-carrying tracks 7. The two components of the composite beam are reflected from a galvanometer mirror M to the objective $O_b$ so as to be focused on that face of the disk which carries the data tracks 7 to two spots 3 and 4 respectively for reading and recording.

After reflection from the disk, the two components of the composite beam follow the reverse optical path and are always circularly polarized but in the clockwise direction. As it passes through the quarter-wave plate 21, the composite beam transmitted by the polarizer cube 20 is again linearly polarized. But the new direction of polarization which is common to the two components of the composite beam after reflection from the disk is orthogonal to the direction of the original beam. As they pass through the cube 20, the two components of the composite beam will consequently be reflected from the face which is common to the two prisms of said cube, namely along the axis $\Delta_2$ at right angles to the axis $\Delta_X$.

An optical focusing system represented schematically by the lens $L_3$ focuses the two components of the emergent composite beam to two spatially distinct spots located in a plane containing the optoelectronic detection means D.

The function of the optical polarizer element 11 will now be explained in greater detail with reference to FIG. 4. This element can be a simple polarizing filter.

When they have been recombined by the cube 10 to form a composite beam, the two recording and reading components respectively have linear directions of polarization at right angles to each other. It is therefore necessary to obtain a common direction of polarization in order to ensure that these two components are wholly transmitted by the polarizer cube 20 without total parasitic reflection (which would result in extinction of one of the two components) or partial parasitic reflection of at least one of these two components (which may prove objectionable). This is a first intended function of said polarizer. This latter also serves to regulate the relative intensities of the two components of the emergent composite beam. It is in fact necessary to make a maximum value of energy available at the time of recording since the focused beam gives rise to disturbances within the material constituting the optical disk as a result of a thermal effect. On the other hand, it is sufficient to ensure that at least a fraction of the intensity of the reading beam is wholly transmitted by the polarizer cube 20. The use of a semitransparent mirror for selectively transmitting or reflecting two equally polarized components would not have permitted the above-mentioned regulation of relative intensities.

The diagram of FIG. 4 illustrates this aspect. The components of the composite beam emerging from the cube 10 have directions of polarization $P_Z$ and $P_Y$ which are respectively parallel to the reference axes Z and Y. The intensities of these components are represented by the vectors $I_1$ and $I_2$. If the polarizer 11 has a direction of polarization P which makes an angle $\alpha$ with the direction of polarization $P_Y$ (that is to say with the axis Y), the resultant intensities of the two reading and recording components are respectively $I'_1$ and $I'_2$. If the two laser sources are identical, the angle $\alpha$ is chosen so as to be smaller than $\pi/2$ radians in order to give preference to that component of the composite beam which is employed for recording.

The assembly consisting of cube 20, quarter-wave plate 21, polarization lens $L_3$ and optoelectronic detection means D must be made capable of moving about the axis $\Delta_X$ in order to cause the optic axis of the cube 20 to coincide with the direction of polarization of the polarizer 11. These two elements can be coupled mechanically. Rotation of the cube 20 (and of the quarter-wave plate 21 associated therewith) about the axis $\Delta_X$ does not disturb the emergent composite beam in any way since this latter has symmetry of revolution by reason of the fact that its two components are circularly polarized at the exit of the quarter-wave plate 21. Furthermore, the angle of inclination of the axes of symmetry of the two components is very small as has already been noted since these axes practically coincide with the axis $\Delta_X$. In practice, this slight inclination can be obtained by positioning one of the laser sources off-center, for example by offsetting the laser source $La_2$ with respect to the axis $\Delta_1$.

The optoelectronic detection device D can comprise four photodiodes $D_1$ to $D_4$ disposed in a plane perpendicular to the axis $\Delta_2$ in the configuration illustrated in FIG. 5. The lens $L_3$ focuses the two components of the reflected composite beam on the plane of the photodiodes to two separate spots, namely a reading spot 3' and a recording spot 4' respectively.

The output signals of the photodiodes $D_1$ and $D_2$ are transmitted to the inputs of two differential amplifiers $A_1$ and $A_2$; the first amplifier forms the sum of the output signals of the photodiodes $D_1$ and $D_3$ and the second amplifier forms the difference between said signals. The signals which are present on the output $S_1$ of the amplifier $A_1$ can be employed for producing signals representing the data read on the disk and the signals which are present on the output $S_2$ of the amplifier $A_2$ can serve to produce signals for vertical position-control of the recording-reading head 2 (as shown in FIG. 3).

The same applies to the recording operation. The outputs of the photodiodes $D_3$ and $D_4$ are connected to a third differential amplifier $A_3$ and this latter forms the sum of the signals which are present on the outputs of these photodiodes. The signals which are present on the output $S_3$ of the differential amplifier $A_3$ can serve to produce signals representing the signals during recording and thus to control this recording operation.

Radial tracking on the disk can be obtained by making use of the recording beam. To this end, the outputs of the photodiodes $D_3$ and $D_4$ are connected to a fourth differential amplifier $A_4$ which forms the difference between the output signals of the photodiodes $D_3$ and $D_4$. The signals which are present on the output $S_4$ of said differential amplifier $A_4$ can be employed for producing error signals.

All these signals are transmitted to electronic processing circuits which are well-known to those skilled in the art. The method of obtaining the signals $S_1$ to $S_4$ is also known and has been recalled only in order to explain the operation of the device according to the invention.

The optical recording-reading device contemplated by the present invention therefore permits good discrimination of the respective reading and recording components of the composite beam while remaining compact and retaining high power efficiency, especially in the case of the component employed at the time of recording.

The device in accordance with the constructional design described with reference to FIG. 3 nevertheless entails the need to ensure that the two cubes 10 and 20 are capable of moving with respect to each other in order to cause the axis of polarization of the polarizer 11 to coincide with the optic axis of the cube 20.

FIG. 6 illustrates a recording-reading device according to the invention in which the two cubes 10 and 20 are fixed with respect to each other. The polarizer 11 of FIG. 3 has been replaced by a half-wave plate 11' which is orientable about the axis $\Delta_x$. In accordance with known practice, a half-wave plate whose optic axis is inclined at an angle with respect to the axis of polarization of a polarized beam causes said axis to rotate through an angle $2\alpha$. The directions of polarization of the components of the composite beam which emerges from the cube 10 will therefore rotate respectively through an angle $2\alpha$ and through an angle $$2\left(\frac{\pi}{2} - \alpha\right),$$

the angle being expressed in radians. In respect of these components, the prism 20 accordingly performs the function of an analyzer and transmits the two reading and recording components along the axis $\Delta_X$. The intensity of said components is equal to the projection of the vectors representing the intensities of said components of the composite beam at the exit of the cube 10 on the optic axis of the cube 20, that is, an axis parallel to the reference axis Z in the example chosen. The two components thus transmitted by the cube 20 has the same direction of polarization which is that of the optic axis of the cube. The other elements are identical with the elements described with reference to FIG. 3 and will not be described further.

Finally, a stigmatic optical device for emission of integrated coherent radiation can be substituted for the prism 10 and for the laser sources $La_1$–$L_1$ and $La_2$–$L_2$. A device of this type is escribed in French patent Application No. 79 28 694 filed on Nov. 21, 1979, especially with reference to FIG. 3 of said application.

Figure 7:
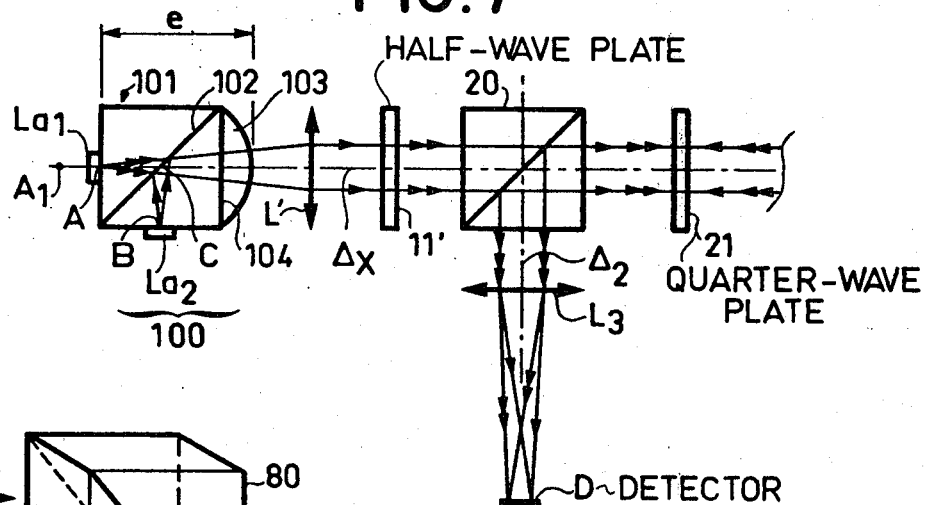

Said alternative embodiment of the present invention is illustrated in FIG. 7.

The element 100 comprises a parallelepiped 101. Unless stated to the contrary in the remainder of the description, said element is designed in the form of a cube constituted by two cemented right prisms. The interface 102 constituted by the hypotenuse of the two prisms is treated so as to produce a polarization-splitting action. Thus said interface transmits all the radiations having a given polarization and totally reflects radiations having a direction of polarization at right angles to the first. A plano-convex lens 103 formed of the same material as the cube is cemented to one of the faces 104 of the cube. The center C of the sphere formed by the convex face of the lens 103 is located on a median plane of the cube. Its radius of curvature R is such that the point A located at the point of intersection of the optic axis $\Delta_X$ of the lens 102 with that face of the cube which is opposite to the face 102 is a Weierstrass point of the spherical refracting surface constituted by the spherical surface of the lens 103. In other words, the optical block constituted by the cube 101 and the lens 103 forms a stigmatic image of the point A at the point $A_1$ which is known to be a virtual image if A is real. The Weierstrass conditions can thus be stated as follows: when the refractive index which is common to the cube and to the lens is n and when the external medium is air: $CA = R/n$, $CA_1 = nR$. The first condition gives the relation between the thickness e of the assembly and the radius R:

$$R = e \frac{n}{n+1}.$$

When this relation is established, if a source of polarized radiation is placed at A in the direction corresponding to a transmission by the face 102 and emits a divergent beam having a semivertex angle $\beta_o$ in air, said angle becomes $\beta$ within the cube and the beam which emerges from the lens and is derived from the virtual point $A_1$ has a semivertex angle $\beta_1$ with sin $$\beta_1 = \frac{\sin \beta}{n} \text{ and } \sin \beta = \frac{\sin \beta_o}{n}.$$

Moreover, since the element 101 is a cube, the point B which is conjugate to A with respect to the face 102 is located on another face of the cube and is also a stigmatic point.

A beam issuing from B and having a direction of polarization at right angles to that of the beam issuing from A is reflected from the face 102 and superimposed on the beam issuing from A. The fact that the parallelepiped 100 and the lens 102 are described as two separate elements is not necessary. The optical block 100-103 can also be constructed in such a manner as to ensure that the face 104 is not materialized.

The element 100 hereinabove described is intended to be employed in conjunction with semiconductor lasers $La_1$ and $La_2$ having their phase center at A and B. An objective represented schematically by the lens L' whose optic axis coincides with the axis $\Delta_X$ is placed behind the lens 103 in order to ensure that its focus is located at the point $A_1$. This objective is so designed as to exhibit no spherical aberrations in respect of maximum values of angular beam divergence in the case of the lasers placed at A and B since the optical system as a whole must remain stigmatic. The objective may consist of a doublet, for example, thereby obtaining the composite parallel beams of the devices described earlier with reference to FIGS. 3 and 6.

There are then shown the half-wave plate 11' of FIG. 6 as well as the other elements which are common to FIGS. 3 and 6. This plate can be replaced by a polarizer as in the alternative embodiment of FIG. 3. Should this be the case, the element 100 must be made capable of rotating about the axis $\Delta_X$.

The invention is not limited solely to the alternative embodiments described in the foregoing. In particular, the elements 10 or 20 can consist of any optical element which completely transmits a polarized beam in a second direction at right angles to the first direction of polarization whereas the direction of reflection is not necessarily at right angles to the direction of transmission. However, the angle between these two directions must be sufficiently large to facilitate the practical construction of the device according to the invention.

What is claimed is:

1. An optical device for recording and reading a data carrier, of the type comprising two fixed radiant-energy sources of the semiconductor laser type having a predetermined wavelength, a first beam for reading data recorded on said data carrier being emitted by the first source aforesaid and a second beam for recording data on said data carrier being emitted by the second source aforesaid, wherein recording and reading are performed by means of a recording-reading head rigidly fixed to a moving system which is displaceable with respect to the data carrier and comprising an objective for focusing the reading and recording beams respectively on predetermined zones of the data carrier, said beams being also reflected from said predetermined zones, said optical device being further provided with first optical means consituting a composite radiant energy source comprising said first and second fixed semiconductor-laser sources which are each provided with stigmantic means for making said beams parallel, said sources being linearly polarized in first and second orthogonal directions and adapted to emit beam components in said first and second emission directions which are parallel respectively to first and second axes, said beam components being passed through an optical element of refractive material having a preferential optic axis parallel to one of said directions of polarization, the incident beam emitted by one of said sources and having a direction of polarization parallel to the preferential optic axis being transmitted by said optical element in a direction parallel to said first axis without modification whilst the incident beam emitted by the other source aforesaid is totally reflected in the same direction by said optical element, said optical device being further provided with second optical means placed on said first axis and comprising a second optical element of refractive material which also has another preferential optic axis, said second optical element being intended to transmit all or part of the composite beam in a direction parallel to said first axis, the direction of polarization of the emergent composite beam being parallel to the other optic axis aforesaid, provision being made for a quarter-wave plate having the function of converting the linear polarization to circular polarization, said polarized composite beam being transmitted to said recording-reading head, and for a convergent optical system placed on a third axis, said composite beam being totally reflected in a direction parallel to said third axis by said second optical element after reflection from the data carrier, the function of the convergent optical system aforesaid being to focus the two components of said beam to two separate and distinct points of impact on an optoelectronic detection device.

2. A device according to claim 1, wherein said first means further comprise a polarizer having an axis of polarization which makes a predetermined angle with the optic axis of said first optical element and transmits said first and second beams forming the two components of said composite beam with a single direction of polarization parallel to the axis of polarization, and wherein the optic axis of said second optical element is parallel to said axis of polarization.

3. A device according to claim 2, wherein said polarizer is rotatable about said first axis in order to adjust the value of the predetermined angle of said second optical element which said second optical element is also rotatable about said axis so as to insure that the optic axis thereof remains parallel to the axis of polarization of said polarizer.

4. A device according to claim 1, wherein the first means further comprise a half-wave plate whose optic axis makes a predetermined angle with the optic axis of said first optical element, said half-wave plate being intended to cause rotation of the directions of polarization of the first and second beans which form said composite beam, each direction being thus rotated through an angle having an amplitude which is double that of said predetermined angle, the optic axis of said second element being parallel to the optic axis of said first element.

5. A device according to claim 4, wherein said half-wave plate is rotatable about said first axis in order to adjust the value of the predetermined angle.

6. A device according to claim 1, wherein said first and second optical elements are each constituted by a cube formed by cementing together two right prisms of refractive material, the interface constituted by the hypotenuse of said two prisms being treated in order to produce a polarization-separating action, said cube being such as to have a preferential optic axis so that an incident beam linearly polarized in a direction parallel to said optic axis is consequently transmitted without modification and that a beam linearly polarized in a direction at right angles to said axis is totally reflected, the directions of transmission and reflection being at right angles to each other.

7. A device according to claim 1, wherein said first optical element is an optical block of refractive material delimited by a first flat face and a convex face of spherical shape, one of the Weierstrass points of the spherical refracting surface formed by the convex face being located on the first flat face, said first face being perpendicular to the straight line which joins said Weierstrass point to the center of the spherical face, said optical block being constituted by two cemented right prisms, the interface between said two prisms being inclined along the line bisecting the dihedron formed by the first flat face and a second flat face of the parallelepiped and a plano-convex lens being cemented against a third flat face opposite to said first flat face.

8. A device according to claim 7, wherein said first source is placed in the vicinity of the Weierstrass point located on the first flat face and said second source is placed in the vicinity of the point which is conjugate to the Weierstrass point with respect to said interface, the interface between the two prisms being totally transmissive in respect of the beam issuing from the first source and totally reflecting in respect of the beam issuing from the second source, a stigmatic optical system being also placed externally of said optical block on the path of the beams emitted by said first and second sources in order to make the emergent beams parallel.

* * * * *